Jan. 11, 1966  O. C. KINDORF  3,229,027
JUNCTION BOX AND CHANNEL TYPE ELECTRIC WIREWAY
Filed May 10, 1963  2 Sheets-Sheet 1
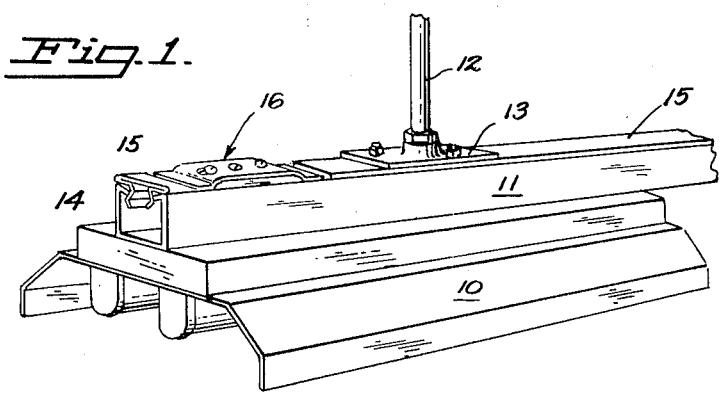
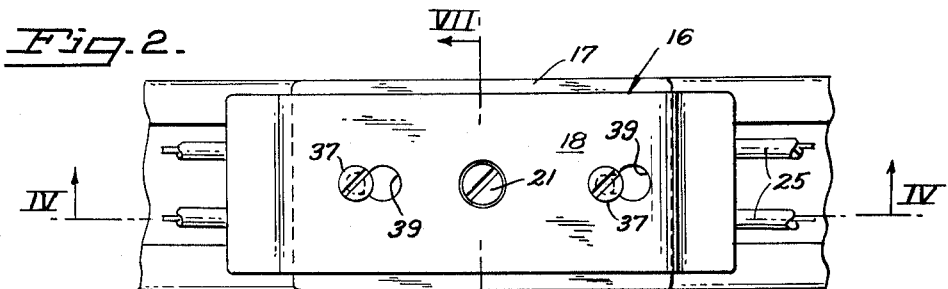
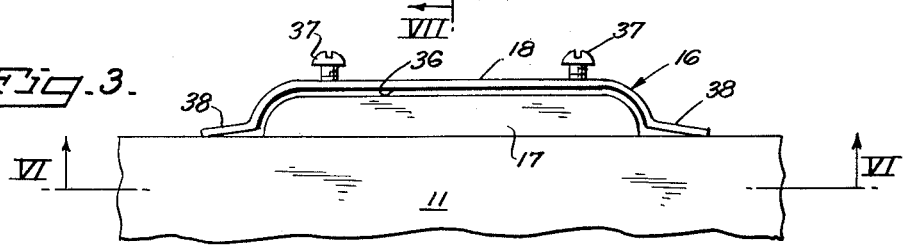
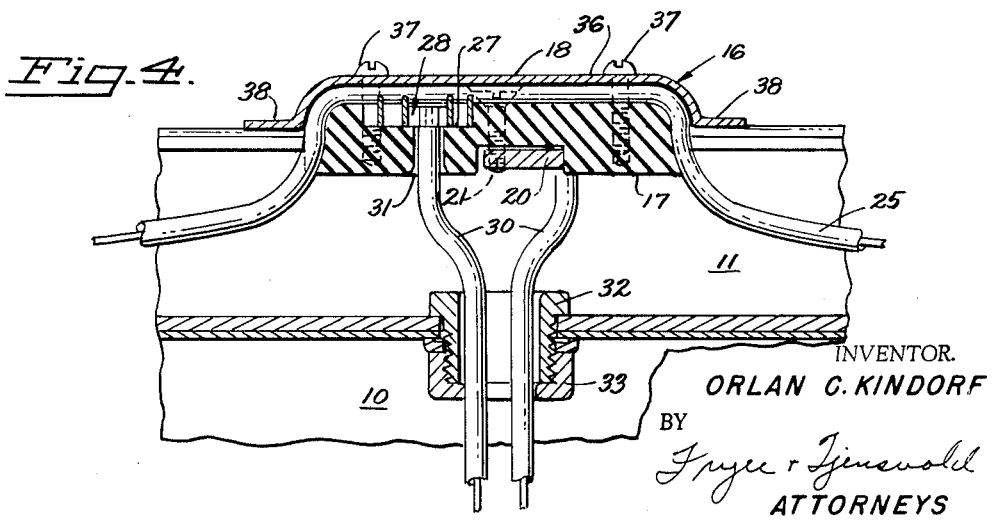
INVENTOR.
ORLAN C. KINDORF
BY
*Fryer + Tjensvold*
ATTORNEYS Jan. 11, 1966  O. C. KINDORF  3,229,027
JUNCTION BOX AND CHANNEL TYPE ELECTRIC WIREWAY
Filed May 10, 1963  2 Sheets-Sheet 2

INVENTOR.
ORLAN C. KINDORF
BY
Fryer + Tjensvold
ATTORNEYS

United States Patent Office 3,229,027
Patented Jan. 11, 1966

3,229,027
JUNCTION BOX AND CHANNEL TYPE
ELECTRIC WIREWAY
Orlan C. Kindorf, 500 Mountain Ave., Piedmont, Calif.
Filed May 10, 1963, Ser. No. 279,415
7 Claims. (Cl. 174—70)

This invention relates to junction boxes and particularly to protective housings for the junction point of electric wires which are in channel-shaped conduits.

It is common practice to support electric fixtures and particularly fluorescent tube-type fixtures on overhead channels supported from above by pipes or rods which depend from the ceiling. The fixtures in some cases are connected directly to the backs of the channels with the channel legs extending upwardly and covers for the channels enclose them so that they may be used for conduits or raceways for electric wires leading to the fixtures. In large areas to be illuminated, as in factories, offices, schools and the like, fixtures are supported in long rows on continuous flights of overhead channels and substantial savings are effected by utilizing the channels for conduits or raceways. It would be convenient to take leads from wires in the channels and direct them downwardly into the fixtures but the Underwriter's Laboratory specifications prohibit the splicing or joining of wires within a conduit and require that all splices or joints be made in a separate junction box. Thus, it is necessary to bring the main wires out of the channel, splice leads to them within a junction box, and direct the leads into the fixture. It is an object of the present invention to provide an improved junction box for use with channel-type fixture supports and wireways which effects a reduction in cost and greatly simplifies installation in comparison with known junction boxes used for this purpose.

Further and more specific objects and advantages of my invention are made apparent in the following specification where the invention is defined in detail by reference to the accompanying drawings.

In the drawings:

FIG. 1 is a perspective view of a well known fluorescent lighting fixture shown as supported by an overhead channel and having a junction box constructed in accordance with the present invention cooperating therewith;

FIG. 2 is a plan view of the junction box in place on a channel;

FIG. 3 is a view in side elevation of the same junction box before the screws which hold the cover in place have been tightened;

FIG. 4 is a sectional view taken on the line IV—IV of FIG. 2 and showing the cover securing screws tightened;

Figure 7:
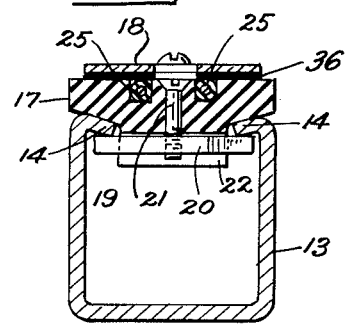
FIG. 7 is a sectional view taken on the line VII—VII of FIG. 2.

In FIG. 1 of the drawings, a typical lighting fixture 10 is shown as supported from an overhead channel-shaped beam 11 by pipes or rods, one of which is shown at 12, and brackets 13. The channel 11 is of a well known type which has inwardly turned flanges 14 on the ends of its legs (see also FIG. 7) to enable various devices to be secured to the channel including a cover plate such as shown at 15 in FIG. 1 and designed to be snapped into place between the flanges 14 to provide a suitable enclosure in the channel for electric wires.

Figure 6:
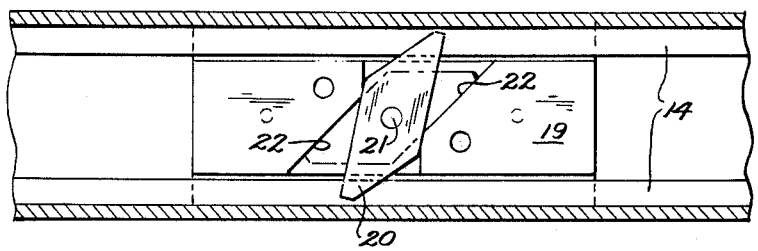
FIG. 6 is a view taken on the line VI—VI of FIG. 3 exposing the bottom of the junction box in place and the means for securing it in a channel.

A junction box constructed in accordance with the present invention is shown at 16 in FIG. 1 and includes a body member 17 (FIGS. 2, 3 and 4) and a cover plate 18. The body member is firmly secured in place between the flanges of the channel by means best illustrated in FIGS. 6 and 7 wherein the body member is shown as having a part 19 fitting between the flanges 14 and a nut 20 on the end of a screw 21 which extends through the body member. The nut is of a known parallelogram type to be received within a recess 22 in the part 19 and, before tightening of the screws, to reside in a position indicated in broken lines in FIG. 6 where it does not interfere with passage of the part 19 to its position between the flanges 14. On turning the screw 21 to tighten the nut, the nut is first swung to the position shown in full lines in FIG. 6 where its ends underlie the flanges 14 and further tightening of the screw draws the nut into firm contact with the flanges.

Figure 5:
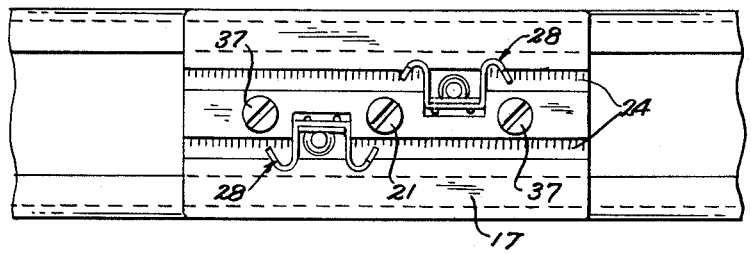
FIG. 5 is a plan view of the junction box with the cover removed and before wires have been led therethrough.
Figure 8:
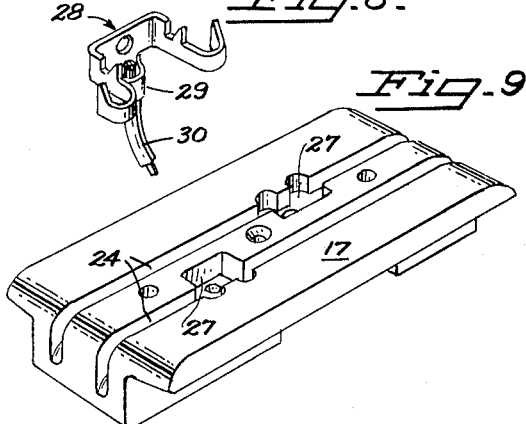
FIG. 8 is an enlarged perspective view of an insulation piercing connector employed in the junction box.
Figure 9:
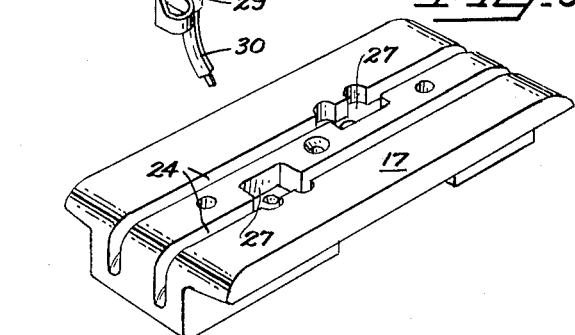
FIG. 9 is a perspective view of the main portion or body of the junction box in which two of the elements shown in FIG. 8 are contained.

The body 17 is provided with two longitudinally extending wire receiving grooves on its outer side as best shown in FIGS. 5 and 9 and two wires with which a connection is to be made, one being shown at 25 in FIG. 4, are lifted from their normal position within the channel before installation of the body member so that they may be trained through the grooves 24 as shown. The wires 25 are in a circuit with which a junction may be made for serving one or more of the light fixtures 10. Each of the grooves 24 has a contiguous pocket 27 for the reception of insulation piercing connectors of a known type, one of which is shown enlarged in FIG. 8 at 28. These connectors are provided with means to form an electrical connection 29 with lead-off wires 30 which, as shown in FIG. 4, pass through openings or passages 31 communicating with the pockets 27 so that they may extend downwardly through the interior of the channel and through a perforation of the channel into the housing of the fixture 10. They are protected in passing through the perforation in the channel and a registering perforation in the housing by a threaded gland 32 and a nut 33 which also serve to form a connection between the fixture 10 and the channel 11.

Figure 10:
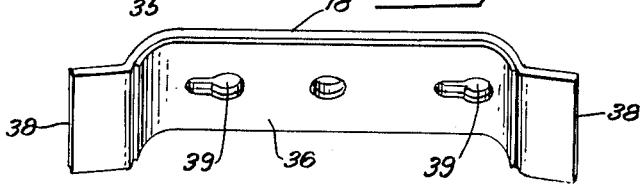
FIG. 10 is a perspective view of the cover plate which fits over the body shown in FIG. 9.

After the body 17 of the junction box is secured in place and the lead-off wires 30 are connected with the wires 25 as described, the cover 18 shown in FIGS. 3, 4 and 10 is applied. This cover is curved downwardly adjacent its ends as shown at 35 to conform to the rounded ends of the body member 17 and to hold the wires 25 firmly in the grooves 24 which, as best shown in FIG. 9, continue downwardly of the ends of the body member so that they are trained into and out of the grooves 24 without being subjected to bending at an abrupt angle. The undersurface of the cover member is provided with a sheet of insulation 36 which completely isolates the wire from the metal of the cover. The cover is held in place by two screws 37 which extend through keyhole slots 39 therein so that it may be assembled to the position shown in FIG. 3 without removing the screws 37 from the body member. The ends of the cover are shaped to provide flanges 38 which are bent downwardly slightly with respect to a plane parallel to the top of the cover. Thus upon assembly, the cover is held in a slightly raised position by the flanges 38 as shown in FIG. 3 and upon tightening of the screws 37 is drawn downwardly until the flanges 38 lie flat against the upper edges of the channel to insure electrical contact or grounding between the cover and the channel to comply with the Underwriter's Code which requires electrical continuity of raceways and enclosures.

Further compliance with the code which prohibits sharp objects such as screw threads within a raceway are complied with by limiting the length of the screws 37 and by terminating the screw 21 which projects only slightly from the nut 20 at a point within the recess provided for the nut to prevent possible abrasion of the insulation of wires being drawn through the channel.

From the foregoing description, it is evident that the wires 25 are removed from the raceway at the point of splicing in compliance with the code which prohibits splices or tape within raceways and with the additional advantage that the raceway is kept as clear as possible to accommodate a large number of wires when required.

I claim:

1. The combination of a junction box and a raceway for electric wires which raceway is of channel shape and has flanges extending inwardly from the legs of the channel-shaped raceway, said junction box comprising a one-piece body member having a part fitting between the flanges and parts resting on the flanges, means to connect lead-off wires to wires from within the channel which are trained over the outside of the body member, said body member having passages to admit the lead-off wires back into the channel and through the back thereof to a fixture supported thereby.

2. The combination of claim 1 in which said body member is secured to the channel by a screw passing through the body member and threaded into a nut underlying the flanges of the channel.

3. The combination of claim 2 in which the body member has a recess to receive said nut.

4. The combination of claim 1 in which the body member has grooves extending throughout its length and inwardly of its ends to receive wires from the channel and has sockets communicating between the grooves and the passages to receive insulating piercing connectors secured to the lead-off wires and making electrical contact with the wires from the channel.

5. The combination of claim 4 with a cover overlying said body member, screws securing the cover to the body member, and means forming a layer of insulation between the cover and the wires in the body member.

6. The combination of claim 5 in which the cover is of metal and has ends contacting the body member to form a ground connection therewith.

7. The combination of claim 6 in which the ends of the cover are in the form of flanges extending outwardly from the cover and inclined slightly toward the flanges of the channel whereby they will make firm contact with the channel when the cover securing screws are tightened.

References Cited by the Examiner
UNITED STATES PATENTS

| | | | |
|---|---|---|---|
| 739,282 | 9/1903 | Bohn | 174—48 |
| 1,817,034 | 8/1931 | Hotchkin | 174—68 X |
| 2,244,883 | 6/1941 | La Ducer | 174—54 X |

OTHER REFERENCES

Weatherized Industrial Fluorescent Fixtures, Sylvania Electric, printed April 1949, page 17.

JOHN F. BURNS, *Primary Examiner.*

JOHN P. WILDMAN, DARRELL L. CLAY, *Examiners.*